INVENTOR.
HAYES B. STEINHAUSER

United States Patent Office 3,414,900
Patented Dec. 3, 1968

3,414,900
METHOD AND MEANS FOR SYNCHRONIZATION OF BEACON TRANSMITTERS FOR AN ALL-WEATHER APPROACH SYSTEM
Hayes B. Steinhauser, Lincoln Park, N.J., assignor to The Bendix Corporation, a corporation of Delaware
Filed June 19, 1967, Ser. No. 646,856
6 Claims. (Cl. 343—102)

ABSTRACT OF THE DISCLOSURE

Means and method for synchronization of ground based beacon transmitters by a radio link so as to cause the transmitters to beam to an optical display carrier by an aircraft in flight, microwave radio signal pulses which follow one another in a fixed sequence in which all beacons emit their pulses within a fixed time interval. These signals from the beacon transmitters which are arranged along sides of a landing strip for the aircraft form an "edge light" image of the runway on the optical display and an image of substantial spacial identity to that of the physical array of the beacons on the ground to provide on the optical display a picture of the runway under adverse weather conditions.

BACKGROUND OF THE INVENTION

Field of the invention

Means and method for providing improved visual communication through inclement weather between an aircraft in flight and a landing runway and in presenting to an occupant of the aircraft a picture of ground based reference points.

Description of the prior art

The invention relates to improvements in an all-weather approach system such as disclosed and claimed in a U.S. Patent No. 3,237,195 granted Feb. 22, 1966 to Julius Schiffman and which may be utilized to effect a display of a pictorial image of a landing runway in an optical display means, such as disclosed and claimed in a copending U.S. application Ser. No. 624,785, filed Mar. 21, 1967 by Francis Henry Sand Rossire, as a continuation-in-part of a now abandoned U.S. application Ser. No. 315,188 filed Oct. 10, 1963, both of said applications and said patent being assigned to The Bendix Corporation.

While it has been a well known expedient to operate such an optical display means by microwave radio signal pulses emitted from each beacon at its own random repetition rate, in the present invention a much improved operation is obtained by synchronizing the operation of all the ground based beacons arranged along the sides of the landing strip so that pulses from the beacons follow one another in a predetermined sequence, with all beacons emitting their pulses within a fixed time interval.

Since the pulses occur in predetermined sequence and are of short duration compared to the interval between pulses, data such as range and attitude may be more effectively computed by the receiving aircraft and spurious responses are eliminated in the time shared display.

The prior art has utilized various synchronization systems such as shown and described in U.S. Patent No. 2,869,121 granted to M. J. Minneman et al issued Jan. 13, 1959, wherein aircraft reception from ground based transmitting stations to determine aircraft position is dependent upon a definite time difference between time of reception of the pulses requiring means for determining round trip time length of the pulse path and means for automatically compensating for variations in the round trip time length; and in U.S. Patent No. 2,644,155 granted to R. A. Emmett, Jr. issued June 30, 1953, wherein a radio landing system is actuated by a signal emitted from an aircraft causing a ground beacon transponder to thereby emit pulses to the aircraft.

In such prior art system, the system accuracy is dependent upon the transmission of substantially identical field patterns from the transmitters and the provision of receiving apparatus including means for determining the relative amplitudes of the pulses received. In a U.S. Patent No. 2,671,897 granted to R. B. Woodbury issued Mar. 9, 1954, a navigation pulse transmitter system is shown and described which requires exact time control emission of pulse signals from ground based transmitters which system necessitates the provision of means responsive to deviation from synchronism of pairs of pulses from a slaved transmitter to control the signal frequency of a master transmitter.

The beacons, other than the master control beacon, in the present invention are provided with receiving means only to actuate the beacons and means as described in the aformentioned Minneman et al. patent for determining round trip time length and means for compensating for variations thereof is not necessary or crucial. Further, the invention herein provided does not require an identical field pattern to be effected as in the aforementioned Emmett patent, which invention may only be used in conjunction with aircraft having special amplitude comparison means and transmitting means to actuate the ground beacon transponder.

Further, in the present invention the exact time delay between sequential pulsing of the plurality of beacons along the runway is not of crucial importance as in the aforementioned Woodbury patent. In particular, aircraft position is accurately displayed in the aircraft even though the pulse interval between two beacons, for example, is slightly different than the pulse interval between two other beacons. Further variations of the time interval between repetitive pulsing of the same successive beacons is not crucial since differences in interval of over a hundred times the pulse width at feasible pulse repetition rates still leaves an interval of sufficient duration before the emission of another beacon thereby avoiding simultaneous pulsing of two or more beacons.

SUMMARY OF THE INVENTION

The invention contemplates the provision of a novel method and means for synchronizing the operation of such land based beacons so that the microwave radio pulses from the beacons follow one another in a fixed sequence with all beacons emitting their microwave pulses within a fixed interval so as to effectively eliminate certain spurious responses in the display caused by simultaneous emission of pulses from more than one beacon at one time as in the prior art arrangements, while providing for the more accurate computing of certain data such as range and altitude of the aircraft in flight from the received pattern of pulses and the more effective utilization of display time when the optical display means is part of a complex time-shared display.

Then the beacons are all operated from a common power line, the beacons may be synchronized from the power line frequency so that the pulse repetition rate of the beacons is the same as the power supply frequency with the pulse emitted by each beacon being delayed an appropriate time so as to follow that of the preceding beacon. However, frequently each beacon may be individually operated from separate power sources, such as individual engine driven alternators as has been found especially advantageous in military use as well as for other portable or temporary installations. The present invention contemplates as an object thereof the provision of a novel means and method for synchronizing such individually powered, microwave radio transmitters or beacons with each other by utilizing one of the beacons as a master control for emitting microwave radio pulses for synchronizing the operation of the other beacons.

Another object of the invention is to provide other of the microwave radio transmitters or beacons to initiate firing operation of succeeding beacons with appropriate delays to effect the sequential firing of the several beacons so that the pulses from the beacons follow one another in sequence with all beacons emitting their pulses within a fixed time interval, and the master control beacon thereafter effectively initiating a repitition of the firing of the several beacons in said predetermined sequence.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE INVENTION

Figure 1:
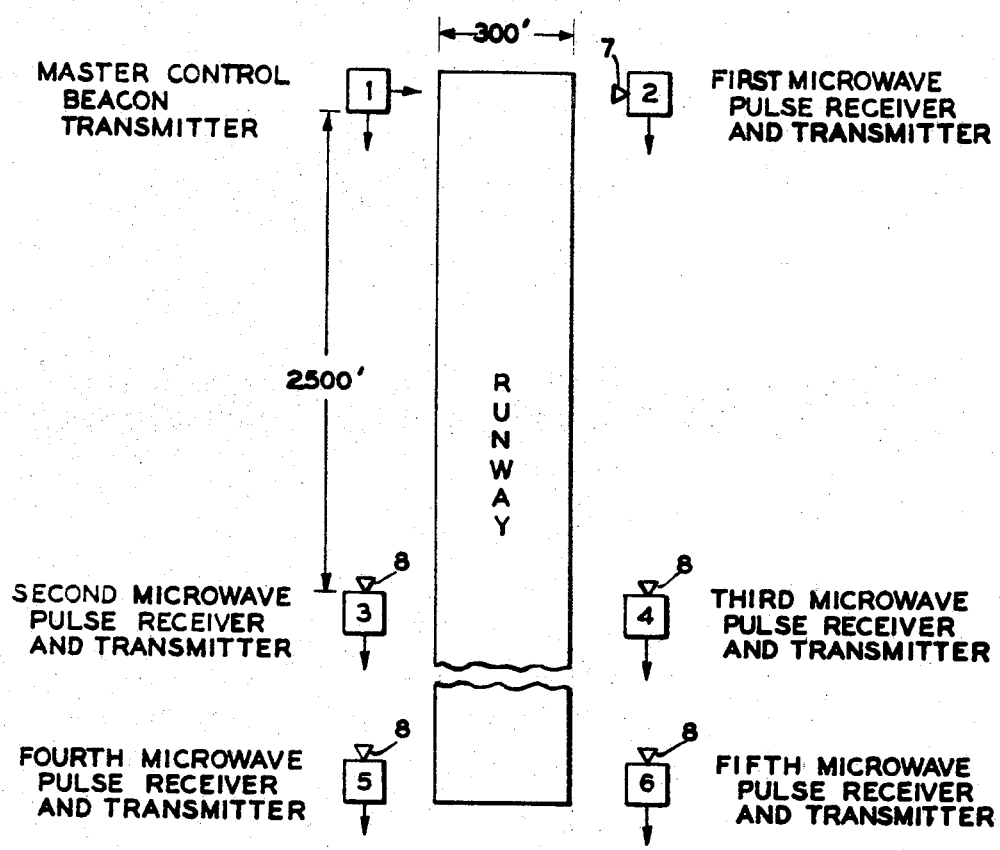
FIGURE 1 is a schematic plan view of a landing runway for an aircraft showing microwave radio signal transmitters or beacons positioned along opposite side of the runway to beam microwave radio signals to the aircraft while in flight.

Referring now to FIGURE 1 of the drawings, six microwave radio pulse transmitter beacons 1–6 are shown positioned along both sides of a landing runway having a width, of for example, between 200 and 300 feet with the beacons positioned along the sides at approximately 2500 foot intervals. The beacons are of a microwave radio pulse transmitter type having transmitting antennas to emit pulses in the direction shown by the arrows. Further, receiving antennas 7 and 8 are provided on beacons 2–6 for directional selectivity as hereinafter more fully explained.

Figure 2:
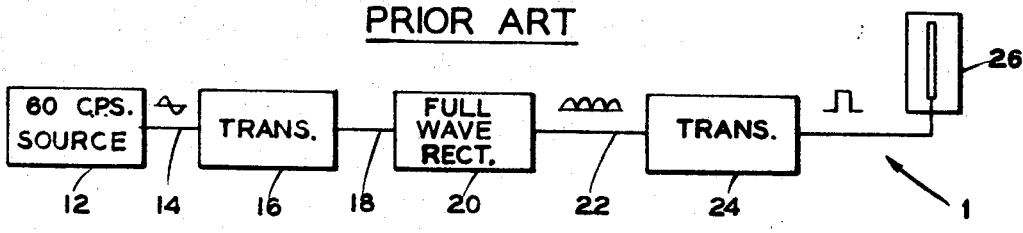
FIGURE 2 is a block diagram of the elements of a conventional and prior art landing beacon synchronized with its own power frequency.

Referring to FIGURE 2, there is shown a schematic circuit diagram of a conventional and prior art type landing beacon which, as indicated by the numeral 1 in FIGURE 1, may serve as a master control beacon. The pulse repetition rate of the beacon 1 may be controlled by a free running oscillator or it may be synchronized with its own power frequency. In the block diagram of the elements of beacon 1, as shown in FIGURE 2, pulse transmission is synchronized with an alternating current power source 12 of, for example, 60 c.p.s. A.C. connected by a line 14 to a transformer 16 having an output line 18 applied to a full wave rectifier 20 so as to effect a 120 c.p.s. wave on line 22 as the control input to a conventional transmitter 24. The transmitter 24 is operative to effect a transmission from an antenna 26 of microwave pulses of 1 microsecond duration at a repetition rate corresponding to the control input frequency of the transmitter, namely 120 c.p.s. as used in the example although higher control frequencies and pulse transmission frequencies have been successfully used in aircraft landing beacon applications.

Figure 3:
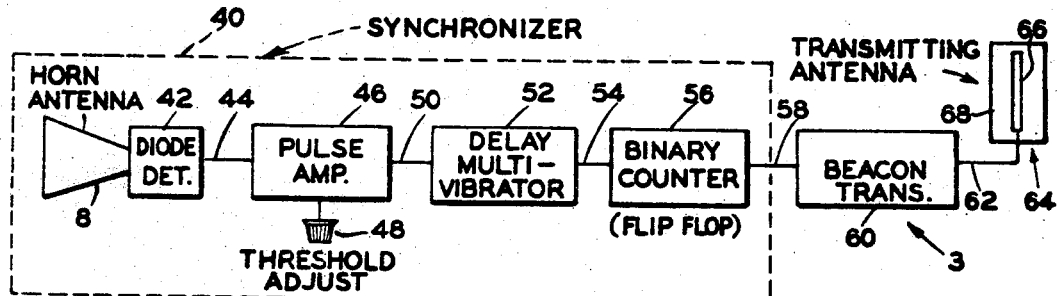
FIGURE 3 is a block diagram illustrative of the elements of beacons 3–6 of FIGURE 1.

Referring to FIGURE 3, a circuit diagram for the beacon 3 is shown which also is typical of beacons 4–6 wherein a synchronizer 40 includes a conventional horn antenna 8 provided to receive the microwave radio frequency energy in the form of 1 microsecond pulses. The signal received by antenna 8 is applied to and detected by a simple diode detector 42 having an output line 44 connected to a pulse amplifier 46. A threshold adjusting mechanism 48 is provided with the amplifier 46 to enable gain control and adjustment for effectively prohibiting amplification of signals of amplitude below the predetermined threshold value.

An amplified pulse signal from amplifier 46 is applied through line 50 to a conventional delay multivibrator 52 to effect a pulse on a line conductor 54 after a delay of a predetermined period of time.

The delay multivibrator 52 is connected by line 54 to a single stage flip flop binary counter 56 provided to cause one pulse on line 58 for every two pulses that are applied through line 54 to the counter. The output line 58 from synchronizer 40 is connected to a conventional radio frequency beacon transmitter 60 having an antenna line 62 connected to a ground based transmitting antenna 64 having a slotted wave guide 66 facing a cylindrical parabola 68 for control of the vertical and horizontal radiation pattern.

A satisfactory antenna configuration which may be used to reduce ground reflections is an antenna known as a shaped beacon slotted array as described in IRE Transactions, Antennas and Propagation Section, September 1960, p. 477; "Maximally Flat and Quasi-Smooth Sector Beam" by A. Ksienski.

Figure 4:
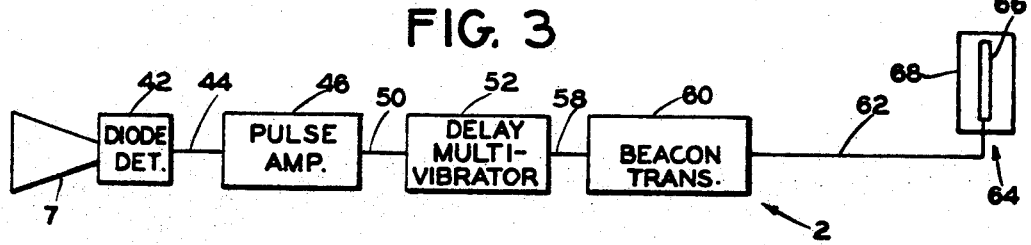
FIGURE 4 is a block diagram of the elements of beacon 2 of FIGURE 1.

Referring to FIGURE 4, the block circuit diagram of beacon 2 is shown having the similar circuit elements of beacons 3 to 6 as particularly described regarding beacon 3 in FIGURE 3, but in beacon 2 the output of a delay multivibrator 52 is applied directly through a line 58 to a beacon transmitter 60, thus omitting the binary counter stage 56 of the beacons 3 to 6, as particularly illustrated with reference to FIGURE 3.

OPERATION

In operation, when beacon 1 pulses in conventional manner and in accordance with its power line frequency, it emits a short pulse of microwave radio frequency energy from its transmitting antenna 26 of FIGURE 2. If now a small receiving antenna 7 is placed on a side of the beacon 2, it will pick up this radio frequency pulse which is then detected by a simple diode detector, amplified, delayed by multivibrator 52 in conventional manner and used to pulse beacon 2, as shown by FIGURE 4.

Similarly, the output pulse from beacon 1 is picked up by the horn antennas 8 of beacons 3 and 4, delayed in appropriate interval of time and used to pulse these beacons 3 and 4. The delay intervals for pulsing beacons 3 and 4 are different from each other beacon to prevent more than one beacon pulsing at the same time. When beacon 2 fires, its output pulse will also be received at beacons 3 and 4 since the receiving antennas 8 do not have enough directivity to discriminate between the pulses from beacons 1 and 2. Beacons 3 and 4 therefore receive two pulses for every one emitted by the master control beacon 1.

In order to prevent beacons 3 and 4 from firing twice as often as the master control beacon 1, a single binary counter stage 56 is inserted in the output of the delay multivibrators 52 of the respective beacons as is particularly shown with reference to FIGURE 3. This single binary counter stage 56 counts down by two so that for every two input pulses received by the counters, one output pulse is produced. In particular, with reference to beacon 3 as shown in FIGURE 3, for every two pulses applied from delay multivibrator 52 on line 54 one output pulse is applied to transmitter 60 through line 58 from binary counter 56. Thus, beacons 3 and 4, although they receive two pulses for every one emitted by master control beacon 1, will fire at the same rate as the beacon 1.

Since the firing of the beacon 2 is controlled from the master control beacon 1, the beacon 2 will always fire after the beacon 1; therefore the sequence of received pulses at beacons 3 and 4 is always a pulse from the master control beacon 1 followed by a pulse from the beacon 2. The counter 56 in beacons 3 and 4 is set up so that the first pulse received (the one from master control beacon 1) triggers the beacons 3 and 4 and the second pulse received which is emitted from the beacon 2 is counted down or by-passed. Beacons 3 and 4 are thus fired by the pulses from the master control beacon 1 and the pulses from beacon 2 cause no action. Further, the multivibrator 52 in beacon 3 may be set to cause a pulse delay time less than the pulse delay in the corresponding multivibrator 52 of beacon 4 so that beacon 3 pulses before beacon 4. Horn receiving antenna 8 of beacon 4 is faced toward beacon 2 so as to avoid a pulsing of the beacon 4 from the radio frequency pulses emitted by beacon 3. Similarly, the horn antenna 8 of beacon 3 is faced toward beacon 1 so that any small signal received at the beacon 3 due to signal transmission from beacon 4 is below the threshold level of amplifier 46 as set by threshold gain adjustment 48 of the beacon 3 and therefore does not actuate beacon 3.

In a similar fashion, beacons 5 and 6 are fired from the output microwave radio pulse produced when beacon 3 fires, beacon 3 now acts as the master control beacon. The distance from beacons 5 and 6 to beacons 1 and 2 is approximately twice as far as the distance from beacons 3 and 4 to beacons 1 and 2. Since the signal strength of the radio frequency pulse emitted by the beacons varies inversely as the square of the distance, the signal strength of pulses received from beacons 1 and 2 at locations 5 and 6 will be only one-fourth the strength of these same pulses received at locations 3 and 4.

The pulse amplifiers in the beacons 5 and 6 corresponding to amplifier 46 of FIGURE 3 are therefore also provided with a gain control threshold adjuster similar to threshold adjuster 48 of pulse amplifier 46, as shown in the block diagram of FIGURE 3, to prevent, upon proper adjustment, the beacons 5 and 6 from responding to pulses emitted by beacons 1 and 2. Beacons 5 and 6 will then respond only to pulses received from beacons 3 and 4 and those from beacons 1 and 2 will be too weak to produce a response.

The pulse delays in each synchronizer of the beacons 5 and 6 are adjusted so that the firing of each beacon occurs in a fixed sequence with the beacon 5 firing first and then beacon 6. Each beacon 5 and 6 receives two pulses for every one pulse it emits. That is, the beacons 5 and 6 both receive the signal pulses transmitted by beacons 3 and 4. Single stage binary counters are provided in beacons 5 and 6 corresponding to the binary counter 56, as shown by FIGURE 3, to provide a by-pass or countdown of one pulse for every two received so that the pulse repetition rate of beacons 5 and 6 is the same as the pulse repetition rate of beacons 3 and 4. Further, the horn antenna 8 of beacon 6 is facing toward beacon 4 and antenna 8 of beacon 5 is facing toward beacon 3 so that any signal received in beacon 6 from beacon 5 or in beacon 5 from beacon 6 is below the signal threshold value of the respective pulse amplifiers 46 of the beacons 5 and 6, and therefore the beacons 5 and 6 do not pulse each other.

Figure 5:
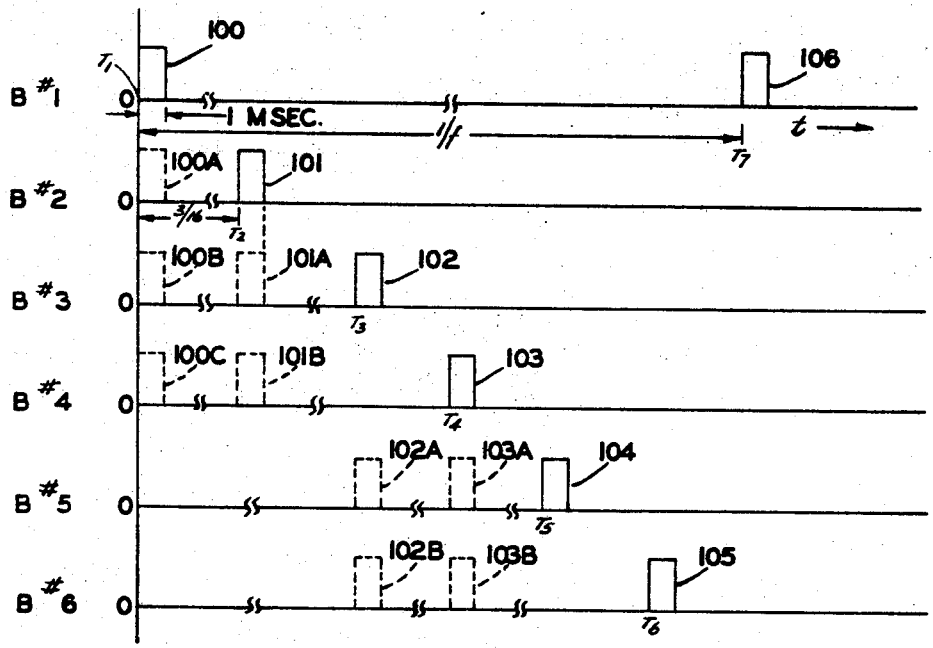
FIGURE 5 is a graphical diagrammatic representation of the synchronized pulse signals transmitted and received by the beacons 1–6 of FIGURE 1.

Referring to FIGURE 5, a diagram of the pulses transmitted and received by each beacon is shown wherein the solid pulses represent the pulse signals transmitted from the respective beacons and the broken line pulses represent the pulse signals received in the respective beacons above the respective threshold adjustment values such as controlled, for example, in beacons 3–6 by the threshold adjustment 48 of the pulse amplifier 46 of FIGURE 3.

At time 1 which may be defined as the beginning of radio frequency signal transmission when beacon 1 first fires in accordance with its oscillating frequency or power line synchronization frequency, a pulse 100 of 1 microsecond duration transmitted from beacon 1 is simultaneously received by antenna 7 of beacon 2 and at antennas 8 of beacons 3 and 4 as indicated by pulses 100A, 100B and 100C. The delay multivibrator 52 of beacon 2, as shown by FIGURE 4, delays the signal for a relatively long interval as compared with the short pulse duration of 1 microsecond.

In particular, if the master beacon 1 fires 120 pulses per second for a repetition period of 1/120 second or .00833 second, all six beacons 1 through 6 fire once during the interval of 1/120 of a second; that is, all beacons are pulsed between successive pulses of master beacon 1. The average interval between the pulses transmitted from successive beacons is therefore $$8.333 \times 10^{-3} \div 6 = 1.388^+ \times 10^{-3}$$

minus 1 microsecond=1387+ microseconds. The average pulse interval between successively pulsed beacons 1–6 is therefore over thirteen hundred times the pulse duration.

At time 2 indicated by $T_2$, beacon 2 fires and transmits signal pulse 101. The pulse 101 is received simultaneously by antennas 8 of the beacons 3 and 4 as indicated by pulses 101A and 101B. At time 3, after the predetermined delay, as determined by the parameters of multivibrator 52 of FIGURE 3, the pulse 100B causes becaon 3 to fire and to transmit pulse 102 which is simultaneously received by antennas 8 of beacons 5 and 6, as indicated by pulses 102A and 102B. The pulse 101A is counted down or by-passed in binary counter 56.

This pulse 102 transmitted from beacon 3 does not affect beacon 4 since the antenna 8 of beacon 4, in facing toward beacon 2, as already explained, receives no signal from beacon 3 of sufficient magnitude to cause firing of beacon 4.

At time 4, a pulse signal 103 is transmitted from beacon 4 which pulse is the delayed pulse caused by received pulse 100C, since the pulse 101B is effectively by-passed. Simultaneously with transmission, the pulse 103 is received at antennas 8 of beacons 5 and 6 as pulses 103A and 103B, respectively.

At time 5, a pulse signal 104 is transmitted from beacon 5 which pulse is the delay pulse caused by the received pulse 102A, since the pulse 103A is effectively by-passed.

At time 6, a pulse signal 105 is transmitted from beacon 6 which pulse is the delay pulse caused by the received pulse 102B since the pulse 103B is effectively by-passed.

At time 7 or 0.00833+ second after time 1, the second pulse 106 is transmitted from the master control beacon 1 and the cycle repeats itself.

Thus, the pulse repetition rate of the master control beacon 1 is so controlled by its power supply frequency or free running oscillator that it emits a second microwave radio pulse following a predetermined delay interval after the time for firing of the last to fire of the beacons, in the example given the beacon 6, so that the master control beacon 1 thereupon effects a repetition of the firing of the beacons 2, 3 and 4, and thereafter 3 and 4 effects a repetition firing of beacons 5 and 6, as heretofore explained.

The sequence of pulse transmission from each beacon may be changed by varying the parameters of the conventional multivibrator of each beacon. Further, the position of the beacons 3–6 may be interchanged with the positions of the others as compared with the positions shown in FIGURE 1 without any adjustment of the synchronizers of the respective beacons 3–6.

More than six beacons may be used in an installation. However, beacons are always arranged in pairs along the edge of the runway. The same system for synchronizing the multiplicity of beacons may therefore be used, each pair of beacons being fired from the preceding pair in the same way beacons 5 and 6 above are fired from beacons 3 and 4.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A system for transmitting radio signal pulses in predetermined sequence from various positions along an aircraft runway to enable safe approach of an aircraft in flight to the runway; the system comprising:

a master control beacon for transmitting radio signal pulses for the indication of a first point alongside the runway including means for transmitting the radio signal pulses in a direction across the runway and parallel to the runway;

a second beacon positioned along the runway and spaced from the master control beacon for transmitting radio signal pulses for indicating a second point along an opposite side of the runway for defining the runway to an occupant of the aircraft as passing between the first and second points as the aircraft approaches the runway, said second beacon including a receiving antenna for receiving the pulses transmitted from the mast control beacon, means for delaying the pulses received by the antenna from the master control beacon for a first predetermined time, and the second beacon transmitting the radio signal pulses after the delay in a direction parallel to the runway;

a third beacon positioned along the runway and spaced from said master control beacon and said second beacon for transmitting radio signal pulses for indicating a third point along the same side of the runway as the first point and in spaced relation to the first point so as to provide signal pulses indicative of a length of the runway to an occupant of the aircraft as the aircraft approaches the runway;

said third beacon including a receiving antenna for receiving pulses transmitted from the master control beacon, means for delaying the pulses received from the master control beacon by the antenna of the third beacon for a second predetermined period of time of different duration than the first predetermined period of time, and the third beacon transmitting the radio signal pulses after the second predetermined period of delay in a direction parallel to the runway;

a fourth beacon positioned along the runway and spaced from said second and third beacons for transmitting radio signal pulses for indicating a fourth point along the same side of the runway as the second point and in spaced relation to the second point for defining the runway as passing between the first and second points and between the third and fourth points and for defining a length of the runway lying between the second and fourth points to an occupant of the aircraft as the aircraft approaches the runway, said fourth beacon including a receiving antenna for receiving pulses transmitted from the master control beacon and said second beacon, and means for delaying the pulses received from the second and master control beacons by the antenna of the fourth beacon for a third predetermined period of time of different duration than the first and second predetermined periods of time, and the fourth beacon transmitting radio signal pulses after the third predtermined period of delay in a direction parallel to the runway.

2. A system for transmitting radio signal pulses in predetermined sequence from various positions along an aircraft runway to enable safe approach of an aircraft in flight to the runway; the system comprising:

a master control beacon for transmitting radio signal pulses for the indication of a first point alongside the runway including means for transmitting the radio signal pulses in a direction across the runway and parallel to the runway;

a second beacon positioned along the runway and spaced from the master control beacon for transmitting radio signal pulses for indicating a second point along an opposite side of the runway for defining the runway to an occupant of the aircraft as passing between the first and second points as the aircraft approaches the runway, said second beacon including a receiving antenna for receiving the pulses transmitted from the master control beacon, means for delaying the pulses received by the antenna from the master control beacon for a first predetermined time, and the second beacon transmitting the radio signal pulses after the delay in a direction parallel to the runway;

a pair of other beacons in one of the directions from said master control beacon and said second beacon for transmitting radio signal pulses for indicating a third point along one side of the runway and a fourth point along the opposite side of the runway at a distance from the first and second points for defining the runway as passing between the first and second points and between the third and fourth points, for indicating a length of runway lying between the first and second points and the third and fourth points, and for indicating the direction of the runway to an occupant of the aircraft as the aircraft approaches the runway;

each of said pair or other beacons including a receiving antenna for receiving pulses transmitted from the master control beacon;

means for delaying the pulses received by the antennas of said other pair of beacons from the master control beacon for predetermined periods of time of different duration from each other and from the first predetermined period of time;

and said other pair of beacons transmitting the radio signal pulses after the predetermined periods of delay in a direction parallel to the runway.

3. A system for transmitting radio signal pulses in predetermined sequence from various positions along an aircraft runway as defined by claim 2 and including:

the second beacon being spaced across the runway substantially opposite said master control beacon;

the receiving antennas of said other pair of beacons being operative to receive the delayed pulses transmitted for the first predetermined period of time by said second beacon; and each of said other pair of beacons further including means for by-passing and rejecting one out of every two signal pulses received by the respective receiving antennas of said other pair of beacons.

4. A method of transmitting radio signal pulses in predetermined sequence from various positions along an aircraft runway to enable safe approach of an aircraft in flight to the runway; the steps comprising:

transmitting radio signal pulses from a master beacon along the runway;

receiving the radio signal pulses in a second beacon spaced from the master beacon;

delaying the received signal pulse from the master beacon for a first predetermined time period;

transmitting the delayed signal pulses from the second beacon;

receiving the signal pulses transmitted from the master beacon and the second beacon in a third beacon adjacent and spaced from the master beacon and the second beacon;

delaying the received signal pulses in the third beacon for a second predetermined period of time of different duration than the first predetermined period of time; and transmitting from the third beacon alternate signal pulses in response to the signal pulses received by said third beacon from the master and second beacons.

5. An aircraft landing beacon for transmitting radio signal pulses to enable safe approach of an aircraft in flight to a runway, said beacon comprising:

means for receiving radio signal pulses;

means for delaying the signal pulses received for a predetermined period of time;

means responsive to the delayed signal pulses for transmitting signal pulses after the predetermined period of time delay, and means connected between the receiving means and the transmitting means for by-passing a predetermined number of signal pulses received whereby a by-passed signal pulse may be effectively prevented from causing a response of the transmitting means.

6. An aircraft landing beacon as defined by claim 5 wherein the by-passing means includes:

a binary counter responsive to every two pulses applied at an input thereof to cause the transmitting means to effect a single output pulse.

References Cited

UNITED STATES PATENTS

| | | | |
|---|---|---|---|
| 2,226,860 | 12/1940 | Greig | 343—101 X |
| 2,585,374 | 2/1952 | Dippy | 343—103 |
| 2,671,897 | 3/1954 | Woodbury | 343—103 X |
| 2,748,385 | 5/1956 | Rust et al. | 343—108 |
| 2,904,752 | 9/1959 | Perzley. | |
| 3,195,135 | 7/1965 | Fleuchaus | 343—108 |

RODNEY D. BENNETT, *Primary Examiner.*

H. C. WAMSLEY, *Assistant Examiner.*

UNITED STATES PATENT OFFICE
CERTIFICATE OF CORRECTION

December 3, 1968

Patent No. 3,414,900

Hayes B. Steinhauser

It is certified that error appears in the above identified patent and that said Letters Patent are hereby corrected as shown below:

Column 7, line 24, "mast" should read -- master --. Column 8, line 67, "pulse" should read -- pulses --.

Signed and sealed this 7th day of April 1970.

(SEAL)
Attest:

Edward M. Fletcher, Jr.

Attesting Officer

WILLIAM E. SCHUYLER, JR.

Commissioner of Patents